(12) United States Patent
Kawasaki

(10) Patent No.: US 10,630,861 B2
(45) Date of Patent: Apr. 21, 2020

(54) IMAGE READING DEVICE AND IMAGE FORMING APPARATUS THEREWITH

(71) Applicant: KYOCERA Document Solutions Inc., Osaka (JP)

(72) Inventor: Kenichiro Kawasaki, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/436,408

(22) Filed: Jun. 10, 2019

(65) Prior Publication Data

US 2019/0387119 A1  Dec. 19, 2019

(30) Foreign Application Priority Data

Jun. 14, 2018 (JP) ................................. 2018-113375

(51) Int. Cl.
*H04N 1/04* (2006.01)
*H04N 1/10* (2006.01)
*H04N 1/193* (2006.01)
*H04N 1/028* (2006.01)

(52) U.S. Cl.
CPC ......... *H04N 1/1061* (2013.01); *H04N 1/0285* (2013.01); *H04N 1/02855* (2013.01); *H04N 1/193* (2013.01)

(58) Field of Classification Search
CPC ............... H04N 1/1061; H04N 1/0285; H04N 1/02855; H04N 1/193

USPC ................................. 358/484, 475, 509, 474
See application file for complete search history.

(56) References Cited

U.S. PATENT DOCUMENTS

| 9,204,006 | B2* | 12/2015 | Kim ................... | H04N 1/02815 |
| 9,277,081 | B2* | 3/2016 | Nagatani ............ | H04N 1/02815 |
| 2002/0054387 | A1* | 5/2002 | Yokota ............... | H04N 1/02835 358/509 |
| 2014/0285857 | A1* | 9/2014 | Yamada ............... | G02B 6/0055 358/474 |
| 2017/0094094 | A1* | 3/2017 | Tanaka ................. | H04N 1/1043 |

FOREIGN PATENT DOCUMENTS

| JP | 2011-61411 A | 3/2011 |
| JP | 2016-67012 A | 4/2016 |

* cited by examiner

*Primary Examiner* — Cheukfan Lee
(74) *Attorney, Agent, or Firm* — Stein IP, LLC

(57) ABSTRACT

An image reading device has a document placement stage, a light source unit, and a sensor unit. The light source unit has a first light source part having a first light source at one end in the main scanning direction and a first light guide, a second light source part having a second light source at the other end in the main scanning direction and a second light guide, a first board where the first light source is mounted, and a second board where the second light source is mounted. The first and second boards each have a board base, a mounting part where the first or second light source is mounted, and a reflection face formed next to the first or second light source. The reflection faces of the first and second board faces face, to overlap the facing faces of the second and first light guides.

8 Claims, 6 Drawing Sheets

Position in the main scanning direction [mm]

IMAGE READING DEVICE AND IMAGE FORMING APPARATUS THEREWITH

INCORPORATION BY REFERENCE

This application is based upon and claims the benefit of priority from the corresponding Japanese Patent Application No. 2018-113375 filed on Jun. 14, 2018, the entire contents of which are incorporated herein by reference.

BACKGROUND

The present disclosure relates to an image reading device that is used in digital copies, image scanners, and the like and that scans a document to read it, and to an image forming apparatus incorporating such an image reading device.

Conventionally, in copiers of a mirror scanning type and the like, an image reading device of a flatbed type is widely used in which a document is placed on a contact glass fixed on a document stage of a document reading part and an image of the document is read while a carriage arranged under the contact glass and incorporating a light source and a mirror is moved (for scanning) parallel to the face of the document by a predetermined driving device.

In such an image reading device, a document is irradiated with light by use of two light sources arranged at opposite sides of a reading region from each other in the sub scanning direction, and reflected light (image light) from the document is converged through a lens to be imaged on a sensor face of a CCD or the like; thereby image data is read out. On the other hand, with the spread of LEDs (light emitting diodes) in recent years, as a light source in the image reading device, a side light type is used that is composed of a cylindrical light guide and LEDs arranged at an end part of it in the longitudinal direction.

For example, there is known an image reading device that includes, as a lighting device, first and second light guides at both ends parts of each of which a pair of first and second light sources are arranged respectively and that controls the light emitting operation of the first and second light sources according to the reading speed and the reading mode, that is, color, black and white, or otherwise. In this method, light is shone into the light guides through their end parts in their longitudinal direction so as to illuminate the document over its entire range in the main scanning direction, and thus there is no need for a large number of LEDs; this helps produce lighting devices at low cost. On the other hand, inconveniently, light from an LED is shone into a light guide through one end part of the light guide, and thus the light leaks from the light guide through its other end part.

To avoid that, a method is used which prevents leakage of light with a reflection member such as aluminum tape provided on an end face of the light guide opposite from the LED. For example, there is known a lighting device that includes a light guide in the shape of a bar, a light source part arranged at one end of the light guide, and a reflector arranged at the other end of the light guide.

SUMMARY

According to one aspect of the present disclosure, an image reading device includes a document placement stage, a light source unit, and a sensor unit. On the document placement stage, a document is placed. The light source unit is placed opposite the document placement stage, and irradiates the document with illumination light. The sensor unit receives reflected light from the document and converts it into an electrical signal. The light source unit includes a first light source part, a second light source part, a first board, and a second board. The first light source part includes a first light source and a first light guide. The first light source is arranged at one end in the main scanning direction. The first light guide is in the shape of a bar elongate in the main scanning direction, and includes a light entrance face which is arranged opposite the first light source and through which light enters along the main scanning direction, a light exit face which extends along the main scanning direction and through which light entered though the light entrance face exits, and a facing face which is arranged opposite from the light entrance face with respect to the main scanning direction and which faces the light entrance face. The second light source part includes a second light source and a second light guide, and is arranged at a predetermined interval from the first light source part in the sub scanning direction perpendicular to the main scanning direction. The second light source is arranged at the other end in the main scanning direction. The second light guide is in the shape of a bar elongate in the main scanning direction, and includes a light entrance face which is arranged opposite the second light source and through which light enters along the main scanning direction, a light exit face which extends along the main scanning direction and through which light entered though the light entrance face exits, and a facing face which is arranged opposite from the light entrance face with respect to the main scanning direction and which faces the light entrance face. On the first board, the first light source is mounted. On the second board, the second light source is mounted. The image reading device moves the light source unit in the sub scanning direction and reads the document placed on the document placement stage. The first and second boards each includes a board base made of metal, a mounting part, and a reflection face. The mounting part is formed by coating the board base with an insulating layer, and on the mounting part, the first or second light source is mounted. The reflection face is formed next to the first or second light source in the sub scanning direction. The reflection face of the first board faces, so as to overlap the entire range of, the facing face of the second light guide, and the reflection face of the second board faces, so as to overlap the entire range of, the facing face of the first light guide.

Further features and advantages of the present disclosure will become apparent from the description of embodiments given below.

DETAILED DESCRIPTION

Figure 1:
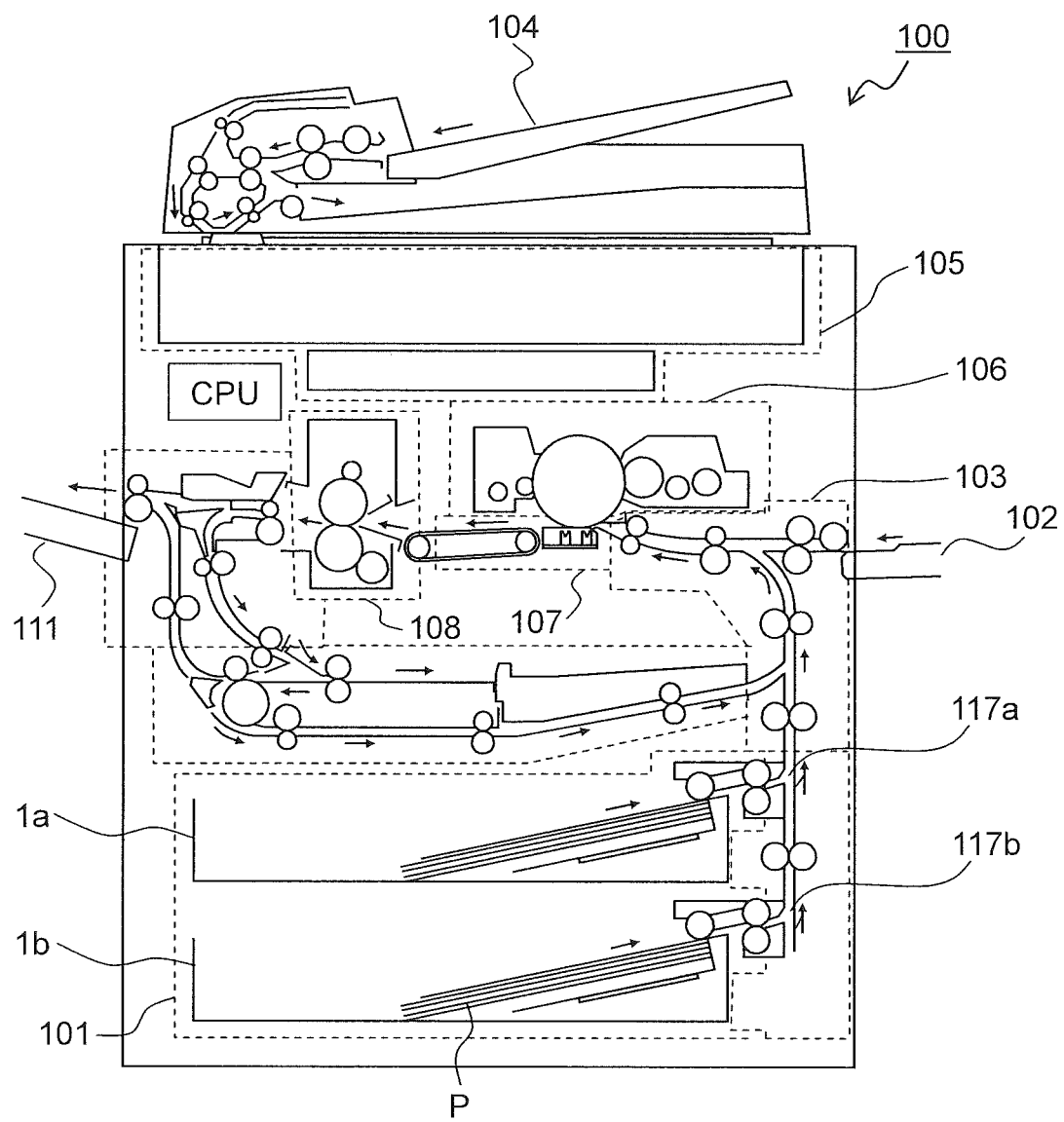
FIG. 1 is a side sectional view showing an internal construction of an image forming apparatus incorporating an image reading device.

Hereinafter, with reference to the accompanying drawings, embodiments of the present disclosure will be described. FIG. 1 is a side sectional view showing an internal construction of an image forming apparatus 100 incorporating an image reading device 105 according to a first embodiment of the present disclosure. In FIG. 1, solid-line arrows indicate conveying paths for and conveying directions of a sheet P.

In FIG. 1, in a lower part of the image forming apparatus 100, a cassette-type sheet feeding portion 101 is arranged. The cassette-type sheet feeding portion 101 includes two sheet feed cassettes 1a and 1b. Inside the sheet feed cassettes 1a and 1b, a stack of sheets P, such as unprinted cut paper, is stored. By sheet feed units 117a and 117b provided in the main body of the image forming apparatus 100, one sheet after another is separated and fed out from the stack of sheets P.

A manual sheet feed portion 102 is provided outside an upper part of the right side face of the image forming apparatus 100. The manual sheet feed portion 102 is for placement of sheets of different sizes and thicknesses from those in the cassette-type sheet feeding portion 101, and sheets that have to be fed in one by one, such as an OHP sheet, envelope, postcard, and invoice.

In the image forming apparatus 100, a sheet conveying portion 103 is arranged. The sheet conveying portion 103 is located to the right, that is, on the downstream side in the sheet feed direction, of the cassette-type sheet feeding portion 101, and is located to the left, that is, on the downstream side in the sheet feed direction, of the manual sheet feed portion 102. A sheet P fed out from the cassette-type sheet feeding portion 101 is conveyed vertically upward along a side face of the main body of the image forming apparatus 100 by the sheet conveying portion 103, and a sheet P fed out from the manual sheet feed portion 102 is conveyed horizontally.

In an upper part of the image forming apparatus 100, an auto document feeder 104 is arranged, and under the auto document feeder 104, an image reading device 105 is arranged. On the top face of the image reading device 105, a contact glass 10 (see FIGS. 2 and 3) comprising a manual placement document glass 10a and an automatic read glass 10b is arranged. In the auto document feeder 104, one sheet of the document after another is separated and fed out from a bundle of a plurality of sheets of the document, and the image data of the document is read by the image reading device 105.

On the downstream side of the sheet conveying portion 103 in the sheet conveying direction, under the image reading device 105, an image forming portion 106 and a transfer portion 107 are arranged. In the image forming portion 106, based on the image data read by the image reading device 105, an electrostatic latent image of the document image is formed, and the electrostatic latent image is then developed to form a toner image. On the other hand, in synchronism with the formation of the toner image in the image forming portion 106, a sheet P is conveyed from the cassette-type sheet feeding portion 101 or the manual sheet feed portion 102 via the sheet conveying portion 103 to the transfer portion 107. The toner image formed in the image forming portion 106 is transferred to the sheet P in the transfer portion 107.

On the downstream side of the transfer portion 107, a fixing portion 108 is arranged. The sheet P having the toner image transferred to it in the transfer portion 107 is conveyed to the fixing portion 108 and passes through a nip portion between a fixing roller pair comprising a heating roller and a pressing roller; the toner image on the sheet P is thereby fixed to become a permanent image. The sheet P discharged from the fixing portion 108 is discharged onto a sheet discharge tray 111 provided outside the left side face of the image forming apparatus 100.

Figure 2:
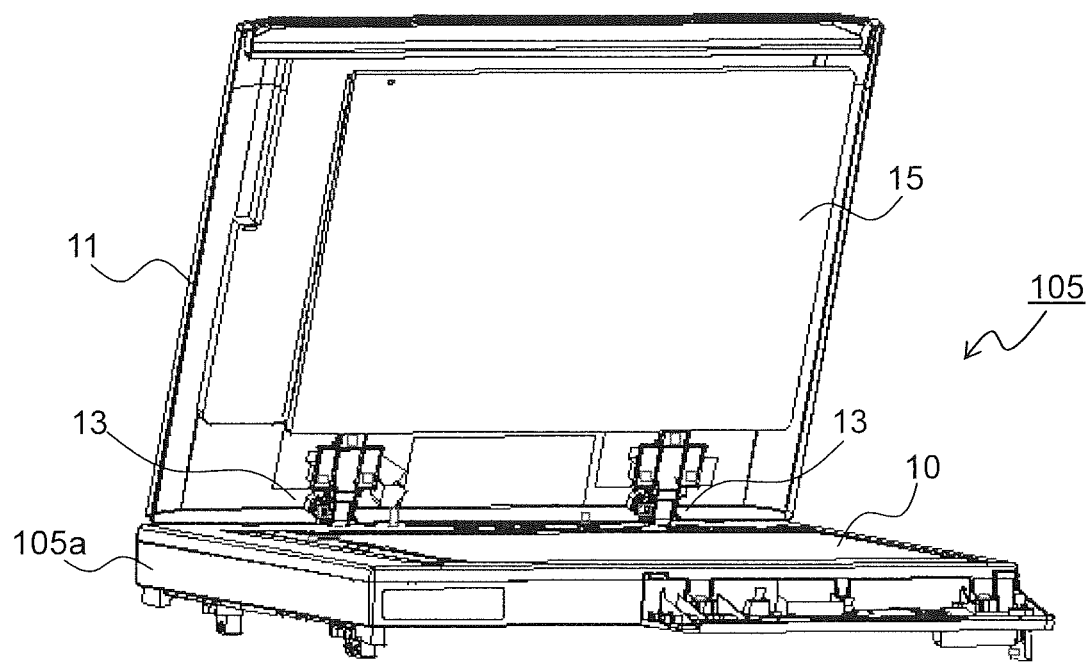
FIG. 2 is a perspective view of the image reading device according to a first embodiment of the present disclosure.

FIG. 2 is a perspective view of the image reading device 105 according to the first embodiment. The image reading device 105 includes the contact glass 10 provided on a top face of a frame 105a (document placement stage) and a platen 11 that presses and thereby holds the document placed on the contact glass 10. The platen 11 is supported so as to be openable and closable in the up-down direction by hinges 13 provided at two places in an end part of the frame 105a. FIG. 2 shows a state with the platen 11 open. The reverse side of the platen 11 is provided with a white mat 15 that presses the document placed on the contact glass 10. To a top face of the platen 11 (the rear face in FIG. 2), the auto document feeder 104 (see FIG. 1) is attached.

Figure 3:
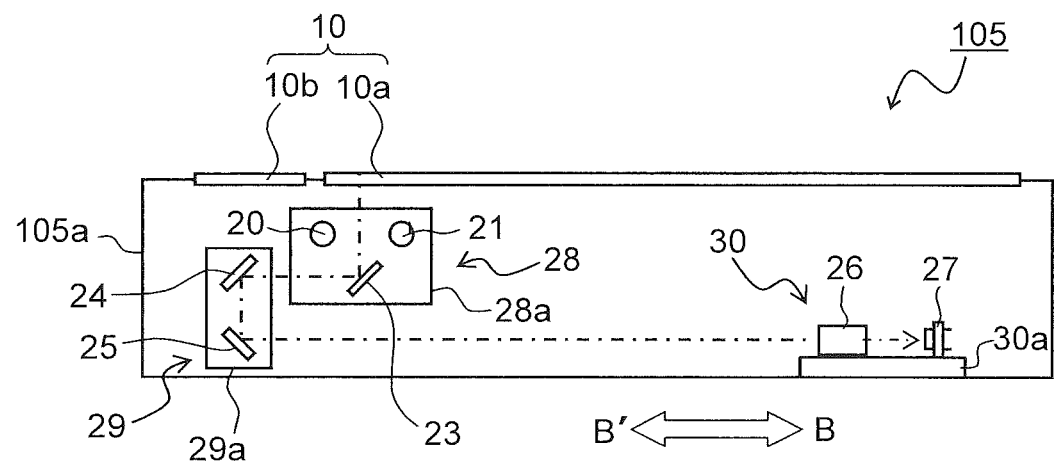
FIG. 3 is a side sectional view showing an internal construction of the image reading device according to the first embodiment.

FIG. 3 is a side sectional view showing an internal construction of the image reading device 105 according to the first embodiment. In the frame 105a of the image reading device 105, there are provided a light source unit 28 that radiates light toward the image side of a document, a mirror unit 29 that reflects reflected light (image light) from the document, and a sensor unit 30 that receives the reflected light to convert it into an electrical signal. In FIG. 3, the optical path of the reflected light from the document is indicated by a dash-dot line.

The light source unit 28 has, fixed on a first carriage 28a, a first light source part 20, a second light source part 21, and a first mirror 23 that directly receives the reflected light (image light) from the document and then reflects it. The mirror unit 29 has, fixed on a second carriage 29a, a second mirror 24 that receives the reflected light from the first mirror 23 and then reflects it, and a third mirror 25 that receives the reflected light from the second mirror 24 and then reflects it. The light source unit 28 and the mirror unit 29 constitutes a scanning means and are reciprocatable in the sub scanning direction (the direction indicated by arrows B and B') independently of, but in coordination with, each other.

The sensor unit 30 has, arranged on a base plate 30a, a lens barrel 26 that holds a lens group (unillustrated) into which the light reflected from the third mirror 25 is directed to be converged, and a line CCD (photoelectric conversion member) sensor 27 provided with a photoelectric conversion element that receives the reflected light converged through the lens group in the lens barrel 26 and converts it into an electrical signal.

When the image of a document placed on the manual placement document glass 10a is read, while the image face of the document is irradiated with light from the first light source part 20 and the second light source part 21, the light source unit 28 and the mirror unit 29 are moved (scanning movement) at a predetermined speed from the scanner home side (in FIG. 3, the left side) to the scanner return side (in FIG. 3, the right side). Here, the light source unit 28 and the mirror unit 29 move while keeping the optical path length of the reflected light between them constant. The light reflected on the image face of the document is reflected on the first mirror 23 to the third mirror 25 to be directed into the lens group in the lens barrel 26, and is converged through the lens group to be imaged on the CCD sensor 27.

On the other hand, when the document image is read in a sheet-through manner by use of the auto document feeder 104, the light source unit 28 and the mirror unit 29 are moved to right under the automatic read glass 10b. Then, the surface of the document which is sequentially conveyed toward the automatic read glass 10b by the auto document feeder 104 is irradiated with light from the first light source part 20 and the second light source part 21. The image light reflected on the image face of the document passes through the first to third mirrors 23 to 25 and the lens barrel 26 to be imaged on the CCD sensor 27.

The image light imaged on the CCD sensor 27 is subjected, in the CCD sensor 27, to photoelectric conversion and is thereby divided into pixels and is converted into electrical signals commensurate with the density at respective pixels. In this way, image reading is achieved.

Figure 4:
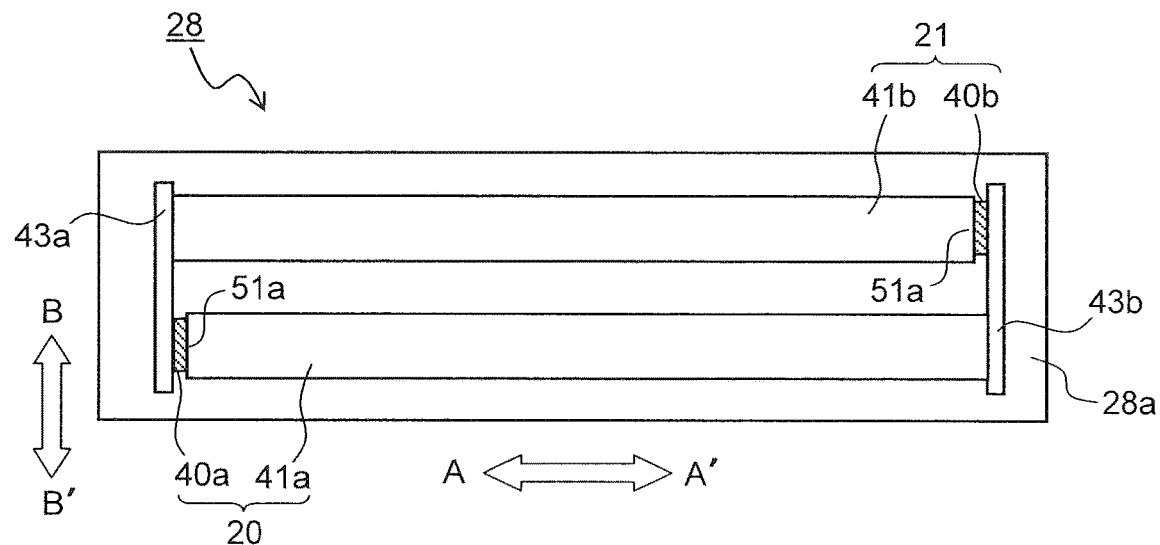
FIG. 4 is a plan view of a first carriage incorporating first and second light source parts used in the image reading device according to the first embodiment.

FIG. 4 is a plan view of the light source unit 28 incorporating the first light source part 20 and the second light source part 21. The first light source part 20 and the second light source part 21 irradiate the document placed on the contact glass 10 with light, with the focus position on the document. The first light source part 20 and the second light source part 21 are arranged on the first carriage 28a along the main scanning direction (in FIG. 4, the direction indicated by arrows A and A').

The first light source part 20 includes a first light source 40a and a first light guide 41a. The second light source part 21 is arranged at a predetermined interval from the first light source part 20 in the sub scanning direction (in FIG. 4, the direction indicated by arrows B and B'), and includes a second light source 40b and a second light guide 41b.

The first light source 40a and the second light source 40b are white LEDs (light emitting diodes) that are in the shape of a thin rectangular plate and that emit white light. As the white LED, for example, a high luminance LED package can be used in which a GaN or InGaN semiconductor light emitting element emitting blue light or ultraviolet light is sealed in transparent resin containing a phosphor. The first light source 40a is arranged opposite an end face (light entrance face 51a) of the first light guide 41a at one side (in the direction of arrow A) in the main scanning direction. The second light source 40b is arranged opposite an end face (light entrance face 51a) of the second light guide 41b at the other side (in the direction of arrow A') in the main scanning direction.

The first light guide 41a and the second light guide 41b are in the shape of a bar elongate in the main scanning direction. The first light guide 41a propagates the illumination light emitted from the first light source 40a in the main scanning direction (the direction of arrow A'), and converts it into illumination light in the shape of a line, eventually emitting it. The second light guide 41b is arranged at a predetermined interval from the first light guide 41a in the sub scanning direction. The second light guide 41b propagates illumination light emitted from the second light source 40b in the main scanning direction (the direction of arrow A), and converts it into illumination light in the shape of a line, eventually emitting it.

Figure 5:
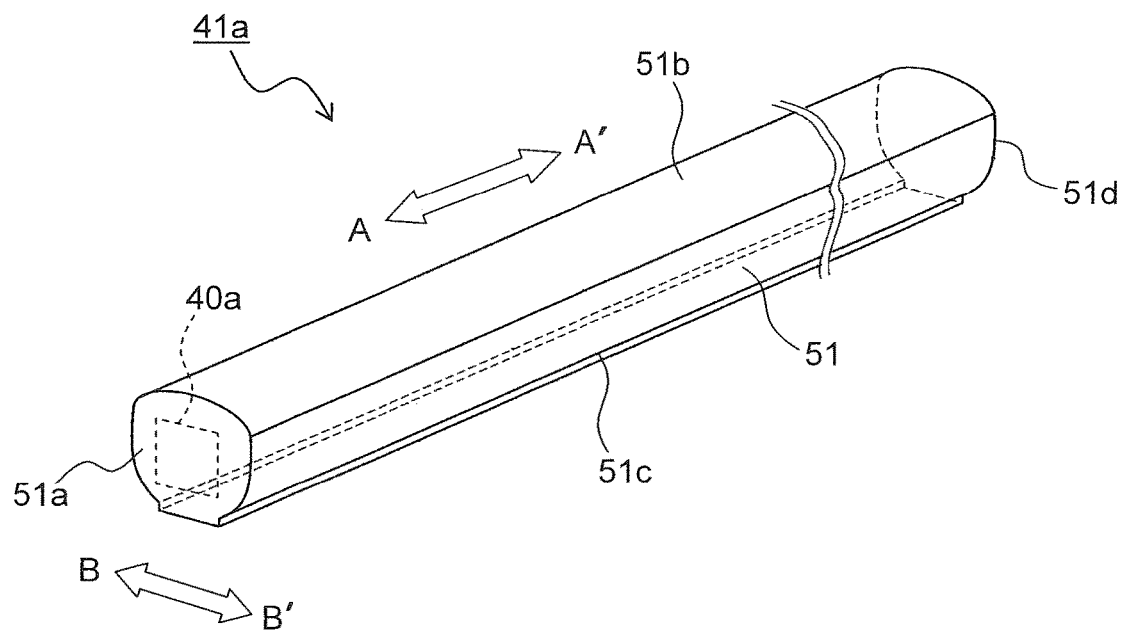
FIG. 5 is a perspective view of a first light guide constituting the first light source part used in the image reading device according to the first embodiment.

FIG. 5 is a perspective view of the first light guide 41a constituting the first light source part 20. Except that the arrangement direction of the second light guide 41b in the light source unit 28 is symmetric in the main scanning direction with that of the first light guide 41a, the second light guide 41b has a structure similar to that of the first light guide 41a; thus, no overlapping description will be repeated.

The first light guide 41a is formed of a resin material which is transmissive to light such as acrylic resin in the shape of a bar, and includes a main body part 51, a light entrance face 51a, a light exit face 51b, and a light reflection face 51c. The main body part 51 guides the illumination light emitted from the first light source 40a. The light entrance face 51a is one end face (in FIG. 5, the side face at near left) of the main body part 51 in the main scanning direction, and is arranged opposite a light emitting face of the first light source 40a.

The light exit face 51b extends over the top face side (the side facing the contact glass 10) of the main body part 51 along the main scanning direction, and is a face through which the illumination light having entered from the light entrance face 51a is emitted toward the contact glass 10 (document). The light exit face 51b is comparatively gently curved in a convex shape in the sub scanning direction.

The light reflection face 51c is formed on the bottom face side of the main body part 51 opposite to the light exit face 51b, and is a strip-form face extending along the main scanning direction. The light reflection face 51c reflects the illumination light propagating in the main body part 51 toward the light exit face 51b. The light reflection face 51c is a flat face on which a plurality of minute prisms (unillustrated) are formed, and those prisms reflect the illumination light toward the light exit face 51b.

With the above-described configuration, a document placed on the contact glass 10 or a document conveyed to the automatic reading position by the auto document feeder 104 is irradiated with light from two light guides, namely the first light guide 41a and the second light guide 41b. In the first light guide 41a and the second light guide 41b, the first light source 40a and the second light source 40b are arranged, respectively. Thus, the document can be irradiated with light from two different directions in the sub scanning direction; it is thereby possible to prevent the appearance of a shadow when reading a document with surface irregularities. As compared with a case where the document is irradiated with light from one light guide, it is possible to irradiate the document with a larger amount of light. The amount of light emitted from each of the first light source 40a and the second light source 40b can be reduced, and thus it is possible to reduce the amount of heat generated by the first light source 40a and the second light source 40b. Accordingly, it is possible to prevent heat deterioration and heat distortion in a light source, a light guide, and members around them.

Since the first light source 40a is arranged at one end of the first light guide 41a and the second light source 40b is arranged at the other end of the second light guide 41b, the illumination light enters the first light guide 41a from one end in the main scanning direction and enters the second light guide 41b from the other end in the main scanning direction. Thus, it is possible to make the illumination light even in the main scanning direction when two light guides, namely the first light guide 41a and the second light guide 41b are used.

Back in FIG. 4, in opposite end parts of the first light source part 20 and the second light source part 21 in the main scanning direction, a first board 43a and a second board 43b are arranged, respectively. The first light source 40a is mounted on the first board 43a and the second light source 40b is mounted on the second board 43b. The first board 43a, at one end in the main scanning direction (an end part in the arrow A direction), supports one end part of the first light guide 41a and the second light guide 41b. The second board 43b, at the other end in the main scanning direction (an end part in the arrow A' direction), supports the other end part of the first light guide 41a and the second light guide 41b.

Figure 6:
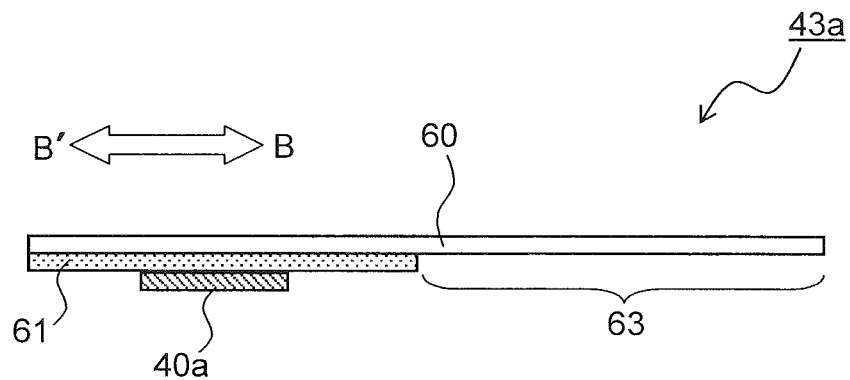
FIG. 6 is a side view, as seen from above, of a first board used in the image reading device according to the first embodiment.
Figure 7:
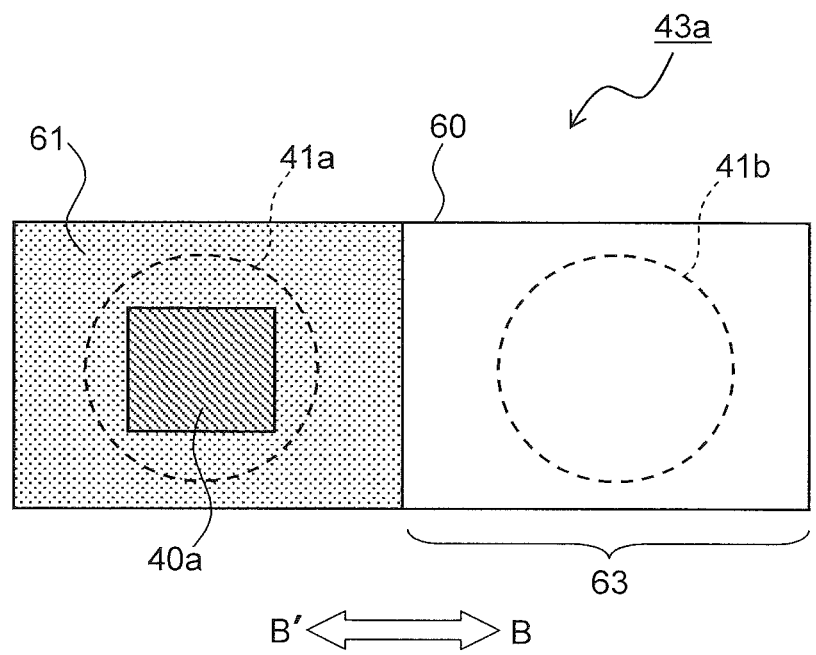
FIG. 7 is a plan view of the first board used in the image reading device according to the first embodiment.

FIG. 6 is a side view of the first board 43a as seen from above. FIG. 7 is a plan view of the first board 43a. As shown in FIGS. 6 and 7, the first board 43a includes a board base 60, a mounting part 61, and a non-mounted face 63.

The board base 60 is formed of a silver-colored metal plate having a metallic luster. In this embodiment, using an aluminum plate as the board base 60 results, as will be described later, in improved light reflectance on the non-mounted face 63 and an improved effect of heat rejection from the LED used as the first light source 40a.

The mounting part 61 is formed by coating the board base 60 with an insulating layer, and electronic components including the first light source 40a are mounted on the mounting part 61. The light entrance face 51a (see FIG. 5) of the first light guide 41a is arranged opposite the first light source 40a. The non-mounted face 63 is formed next to the mounting part 61 in the sub scanning direction, and is a face where a metal surface of the board base 60 is exposed. A facing face 51d (see FIG. 5) of the second light guide 41b opposite from its light entrance face 51a is arranged opposite the non-mounted face 63.

Although no illustration is given here, except that the arrangement direction of the second board 43b in the light source unit 28 is symmetric in the main and sub scanning directions with that of the first board 43a, the second board 43b has a structure similar to that of the first board 43a. The second light source 40b is mounted on the mounting part 61 of the second board 43b, and the light entrance face 51a of the second light guide 41b is arranged opposite the mounting part 61 of the second board 43b. The facing face 51d of the first light guide 41a is arranged opposite the non-mounted face 63 of the second board 43b.

In the configuration according to this embodiment, the non-mounted faces 63 of the first and second boards 43a and 43b face the facing faces 51d of the second and first light guides 41b and 41a, respectively. Thus, light that has entered through the light entrance faces 51a of the first and second light guides 41a and 41b, that has then passed through the main body part 51, and that has then reached the facing face 51d is reflected from the non-mounted face 63 where the metal surface is exposed. That is, the non-mounted face 63 functions as a reflection face reflecting light emitted from the facing face 51d. The light reflectance of the non-mounted face 63 is preferably 85% or more.

By simply extending the first and second boards 43a and 43b in the sub scanning direction, it is possible to form the non-mounted face 63, which is the reflection face, and thus there is no need to attach a reflection member such as aluminum tape to the facing face 51d of the first and second light guides 41a and 41b. As a result, it is possible to reduce the numbers of components and of processes for assembly.

In addition, forming the first and second boards 43a and 43b in the same shape and using the first board 43a rotated through 180° as the second board 43b makes it possible to use a board common to the first and second boards 43a and 43b; it is thereby possible to reduce the number of components and the manufacturing cost.

Figure 8:
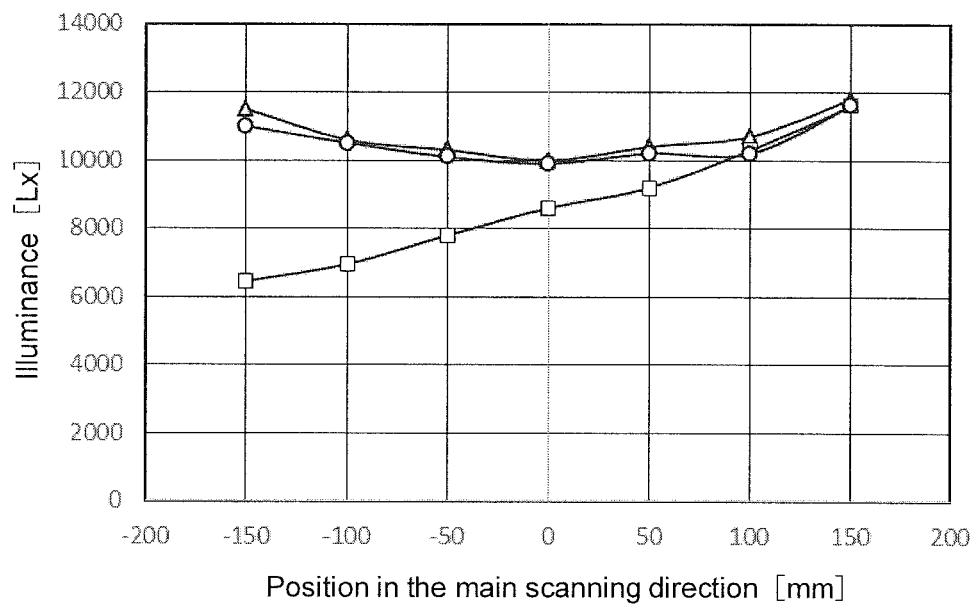
FIG. 8 is a graph showing a simulated distribution, in the main scanning direction, of the light from the first light source part used in the image reading device according to the first embodiment.

FIG. 8 is a graph showing a simulated distribution, in the main scanning direction, of the light from the first light source part 20 used in the image reading device 105 according to the first embodiment. In FIG. 8, the horizontal axis represents position in the main scanning direction, and the vertical axis represents illuminance (Lx). For position in the main scanning direction in FIG. 8, with a middle part of the first light guide 41a in its longitudinal direction taken as 0, the positive side is the light entrance face 51a (the first light source 40a) side, and the negative side is the facing face 51d side.

As shown in FIG. 8, with the configuration according to this embodiment (in FIG. 8, the data series indicated by hollow circular symbols), where the non-mounted face 63 formed on the second board 43b is arranged opposite the facing face 51d of the first light guide 41a, as with the conventional configuration (in FIG. 8, the data series indicated by hollow triangular symbols), where aluminum tape is attached to the facing face 51d of the first light guide 41a, it is possible to obtain an illuminance of 10000 Lx or more over the entire range of the first light guide 41a in its longitudinal direction. On the other hand, with a configuration (in FIG. 8, the data series indicated by hollow square symbols), where no aluminum tape is attached to the facing face 51d of the first light guide 41a, and where no non-mounted face 63 is formed on the second board 43b, illuminance is increasingly low from the light entrance face 51a toward the facing face 51d.

The results of a simulation of the distribution, in the main scanning direction, of the light from the second light source part 21 having the second light source 40b and the second light guide 41b are similar to those shown in FIG. 8. Based on the above results, it has been confirmed that forming the non-mounted face 63 on the first and second boards 43a and 43b makes it possible to effectively prevent leakage of light through the facing face 51d of the first and second light guides 41a and 41b.

Figure 9:
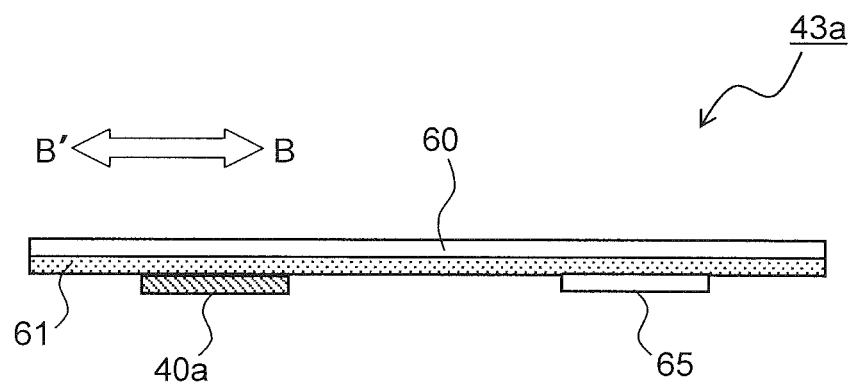
FIG. 9 is a side view, as seen from above, of a first board used in an image reading device according to a second embodiment of the present disclosure.
Figure 10:
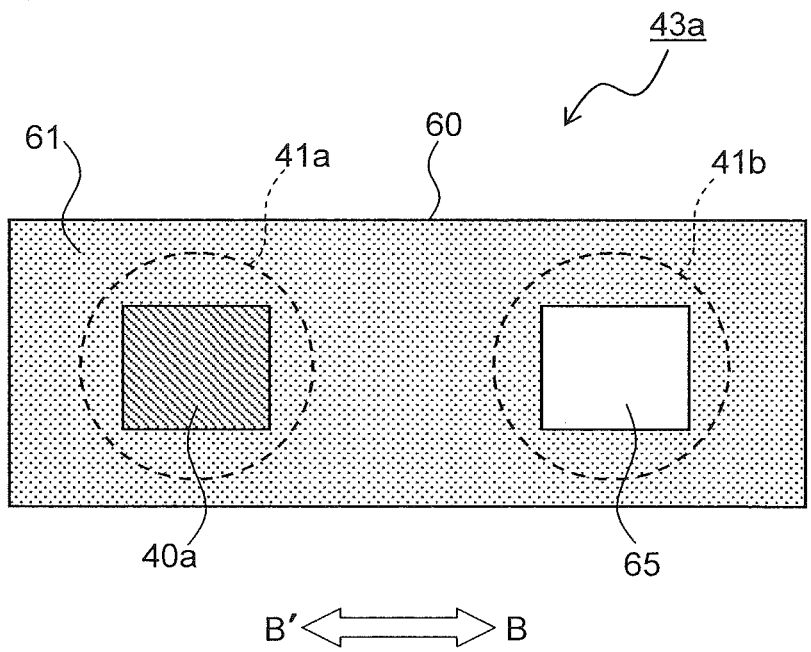
FIG. 10 is a plan view of the first board used in the image reading device according to the second embodiment.

FIG. 9 is a side view, as seen from above, of a first board 43a used in an image reading device 105 according to a second embodiment of the present disclosure. FIG. 10 is a plan view of the first board 43a used in the image reading device 105 according to the second embodiment. As shown in FIGS. 9 and 10, the first board 43a includes a board base 60 and a mounting part 61. The mounting part 61 is formed so as to cover the entire face of the board base 60.

A first light source 40a is mounted on the mounting part 61 at one side (in FIG. 10, the left side) in the sub scanning direction, and an electrode pad 65 is formed on the mounting part 61 at the other side (in FIG. 10, the right side) in the sub scanning direction. The electrode pad 65 is a soldered part formed by placing solder (containing tin as the main component) on the mounting part 61 when the first board 43a is fabricated, and the surface of the electrode pad 65 has a metallic luster. A light entrance face 51a (see FIG. 5) of a first light guide 41a is arranged opposite the first light source 40a. A facing face 51d (see FIG. 5) of a second light guide 41b opposite from its light entrance face 51a is arranged opposite the electrode pad 65.

Although no illustration is given here, except that the arrangement direction of a second board 43b in a light source unit 28 is symmetric in the main and sub scanning directions with that of the first board 43*a*, the second board 43*b* has a structure similar to that of the first board 43*a*. On the mounting part 61 of the second board 43*b*, a second light source 40*b* is mounted and the electrode pad 65 is formed. The light entrance face 51*a* of the second light guide 41*b* is arranged opposite a second light source 40*b*. The facing face 51*d* of the first light guide 41*a* is arranged opposite the electrode pad 65.

In this configuration according to this embodiment, the electrode pad 65 formed on the first and second boards 43*a* and 43*b* face the facing faces 51*d* of the second and first light guides 41*b* and 41*a*, respectively. Thus, light that has entered through the light entrance faces 51*a* of the first and second light guides 41*a* and 41*b*, that has then passed through a main body part 51, and that has then reached the facing face 51*d* is reflected from the electrode pad 65 having a metallic luster. That is, the electrode pad 65 functions as a reflection face reflecting light emitted from the facing face 51*d*.

By extending the first and second boards 43*a* and 43*b* in the sub scanning direction and soldering the mounting part 61, it is possible to form the electrode pad 65, which functions as the reflection face, and thus there is no need to attach a reflection member such as aluminum tape to the facing face 51*d* of the first and second light guides 41*a* and 41*b*. As a result, it is possible to reduce the numbers of components and of processes for assembly.

In addition, forming the first and second boards 43*a* and 43*b* in the same shape and using the first board 43*a* rotated through 180° as the second board 43*b* makes it possible to use a board common to the first and second boards 43*a* and 43*b*; it is thereby possible to reduce the number of components and the manufacturing cost.

Figure 11:
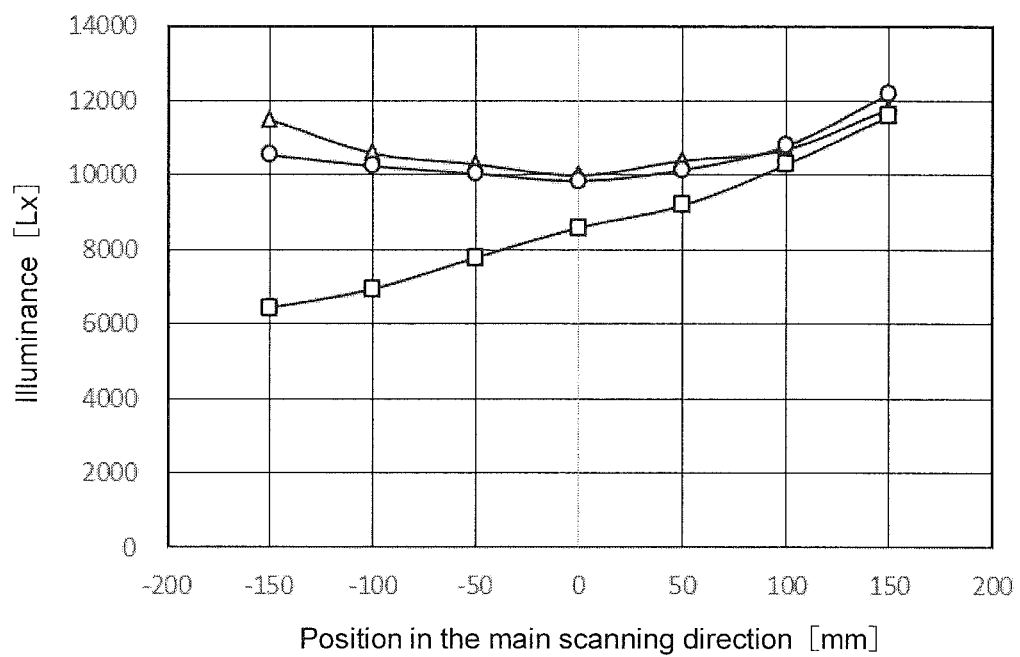
FIG. 11 is a graph showing a simulated distribution, in the main scanning direction, of the light from a first light source part used in the image reading device according to the second embodiment.

FIG. 11 is a graph showing a simulated distribution, in the main scanning direction, of the light from a first light source part 20 used in the image reading device 105 according to the second embodiment. In FIG. 11, the horizontal axis represents position in the main scanning direction, and the vertical axis represents illuminance (Lx). For position in the main scanning direction in FIG. 11, with a middle part of the first light guide 41*a* in its longitudinal direction taken as 0, the positive side is the light entrance face 51*a* (the first light source 40*a*) side, and the negative side is the facing face 51*d* side.

As shown in FIG. 11, with the configuration according to this embodiment (in FIG. 11, the data series indicated by hollow circular symbols), where the electrode pad 65 formed on the second board 43*b* is arranged opposite the facing face 51*d* of the first light guide 41*a*, as with the conventional configuration (in FIG. 11, the data series indicated by hollow triangular symbols), where aluminum tape is attached to the facing face 51*d* of the first light guide 41*a*, it is possible to obtain an illuminance of 10000 Lx or more over the entire range of the first light guide 41*a* in its longitudinal direction. On the other hand, with a configuration (in FIG. 11, the data series indicated by hollow square symbols), where no aluminum tape is attached to the facing face 51*d* of the first light guide 41*a*, and where no electrode pad 65 is formed on the second board 43*b*, illuminance is increasingly low from the light entrance face 51*a* toward the facing face 51*d*.

The results of a simulation of the distribution, in the main scanning direction, of the light from a second light source part 21 having the second light source 40*b* and the second light guide 41*b* are similar to those shown in FIG. 11. Based on the above results, it has been confirmed that forming the electrode pad 65 on the first and second boards 43*a* and 43*b* makes it possible to effectively prevent leakage of light through the facing face 51*d* of the first and second light guides 41*a* and 41*b*.

The present disclosure may be implemented in any other manner than in the embodiments described above, and allows for many modifications without departure from the spirit of the present disclosure. Although, for example, the embodiments described above deal with, as an example, an image reading device 105 incorporated in an image forming apparatus 100, the present disclosure is applicable equally to an image scanner used separately from an image forming apparatus 100.

The present disclosure finds application in image reading devices that are used in digital copiers, image scanners, and the like and that scan a document to read it. Based on the present disclosure, it is possible to provide an image reading device that can prevent leakage of light from an end part of a light guide without increasing the number of components and of processes for assembly, and to provide an image forming apparatus incorporating such an image reading device.

What is claimed is:

1. An image reading device comprising:
   a document placement stage on which a document is placed;
   a light source unit which is placed opposite the document placement stage, the light source unit irradiating the document with illumination light; and
   a sensor unit which receives reflected light from the document, the sensor unit converting the reflected light into an electrical signal,
   the light source unit including:
      a first light source part including:
         a first light source which is arranged at one end in a main scanning direction; and
         a first light guide which is in a shape of a bar elongate in the main scanning direction,
         the first light guide having:
            a light entrance face which is arranged opposite the first light source and through which light enters along the main scanning direction;
            a light exit face which extends along the main scanning direction and through which light entered through the light entrance face exits; and
            a facing face which is arranged opposite from the light entrance face with respect to the main scanning direction and which faces the light entrance face,
      a second light source part including:
         a second light source which is arranged at another end in the main scanning direction; and
         a second light guide which is in a shape of a bar elongate in the main scanning direction,
         the second light guide having:
            a light entrance face which is arranged opposite the second light source and through which light enters along the main scanning direction;
            a light exit face which extends along the main scanning direction and through which light entered through the light entrance face exits; and
            a facing face which is arranged opposite from the light entrance face with respect to the main scanning direction and which faces the light entrance face, the second light source part being arranged at a predetermined interval from the first light source part in a sub scanning direction perpendicular to the main scanning direction;

a first board on which the first light source is mounted; and a second board on which the second light source is mounted, the image reading device moving the light source unit in the sub scanning direction and reading the document placed on the document placement stage, wherein the first and second boards each includes a board base made of metal;

a mounting part which is formed by coating the board base with an insulating layer and on which the first light source or the second light source is mounted; and a reflection face formed next to the first light source or the second light source in the sub scanning direction, and the reflection face of the first board faces, so as to overlap an entire range of, the facing face of the second light guide, and the reflection face of the second board faces, so as to overlap an entire range of, the facing face of the first light guide.

2. The image reading device according to claim 1, wherein the board base is formed of a silver-colored metal plate having a metallic luster, and the reflection face is formed next to the mounting part in the sub scanning direction, and is a non-mounted face where a metal surface of the board base is exposed.

3. The image reading device according to claim 2, wherein the board base is made of an aluminum plate.

4. The image reading device according to claim 1, wherein the reflection face is an electrode pad made of metal which is formed on a surface of the mounting part.

5. The image reading device according to claim 4, wherein the electrode pad is a soldered part formed on the surface of the mounting part.

6. The image reading device according to claim 1, wherein a light reflectance of the reflection face is 85% or more.

7. The image reading device according to claim 1, wherein the first and second boards are formed in a same shape and the first board rotated through 180° is used as the second board.

8. An image forming apparatus comprising;

the reading device according to claim 1.

* * * * *